US008037250B1

(12) United States Patent
Barreh et al.

(10) Patent No.: US 8,037,250 B1
(45) Date of Patent: Oct. 11, 2011

(54) ARBITRATING CACHE MISSES IN A MULTITHREADED/MULTI-CORE PROCESSOR

(75) Inventors: Jama I. Barreh, Austin, TX (US); Manish K. Shah, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 2009 days.

(21) Appl. No.: 11/008,014

(22) Filed: Dec. 9, 2004

(51) Int. Cl.
*G06F 12/00* (2006.01)
*G06F 13/00* (2006.01)
*G06F 13/28* (2006.01)

(52) U.S. Cl. ...................................................... 711/125
(58) Field of Classification Search .................... 711/125
See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,423,016 A | 6/1995 | Tsuchiya et al. | |
| 5,515,308 A | 5/1996 | Karp et al. | |
| 5,546,593 A | 8/1996 | Kimura et al. | |
| 5,619,439 A | 4/1997 | Yu et al. | |
| 5,809,530 A | 9/1998 | Samra et al. | |
| 5,870,599 A | 2/1999 | Hinton et al. | |
| 5,897,654 A * | 4/1999 | Eisen et al. | 711/131 |
| 5,918,247 A | 6/1999 | Patel et al. | |
| 5,933,850 A | 8/1999 | Kumar et al. | |
| 5,954,789 A | 9/1999 | Yu et al. | |
| 5,983,310 A * | 11/1999 | Adams | 711/6 |
| 6,016,542 A | 1/2000 | Gottlieb et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,145,054 A | 11/2000 | Mehrotra et al. | |
| 6,161,166 A * | 12/2000 | Doing et al. | 711/125 |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |

(Continued)

OTHER PUBLICATIONS

Handy, The Cache Memory Book, 1998, Academic Press, pp. 63-64.*

(Continued)

*Primary Examiner* — Kevin Ellis
*Assistant Examiner* — Chad L Davidson
(74) *Attorney, Agent, or Firm* — Lawrence J. Merkel; Meyertons, Hood, Kivlin, Kowert & Goetzel, P.C.

(57) ABSTRACT

In one embodiment, a processor comprises a cache and a cache miss unit coupled to the cache. The cache is coupled to be accessed by cache accesses corresponding to a plurality of threads active in the processor. The cache miss unit is configured to record a plurality of cache misses detected in the cache and to associate each cache miss of the plurality of cache misses with a corresponding thread of the plurality of threads for which that cache miss is detected. Additionally, the cache miss unit is configured to initiate a cache fill for a selected cache miss of the plurality of cache misses. The cache miss unit is configured to select the selected cache miss based on a prioritization of the corresponding threads associated with the plurality of cache misses. In one implementation, the cache is an instruction cache and the cache misses are due to fetches corresponding to the plurality of threads.

28 Claims, 8 Drawing Sheets

U.S. PATENT DOCUMENTS

| | | | |
|---|---|---|---|
| 6,349,319 B1 | 2/2002 | Shankar et al. | |
| 6,357,016 B1 | 3/2002 | Rodgers et al. | |
| 6,381,676 B2 * | 4/2002 | Aglietti et al. | 711/133 |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,438,650 B1 | 8/2002 | Quach et al. | |
| 6,496,925 B1 | 12/2002 | Rodgers et al. | |
| 6,507,862 B1 | 1/2003 | Joy et al. | |
| 6,516,405 B1 | 2/2003 | Jourdan et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,658,534 B1 | 12/2003 | White et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,745,291 B1 | 6/2004 | York | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,871,264 B2 * | 3/2005 | Soltis, Jr. | 711/122 |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 7,032,076 B2 | 4/2006 | Sprangle et al. | |
| 7,134,002 B2 | 11/2006 | Shoemaker | |
| 2006/0026594 A1 | 2/2006 | Yoshida et al. | |
| 2006/0037017 A1 * | 2/2006 | Accapadi et al. | 718/100 |

OTHER PUBLICATIONS

Alverson et al., "Tera Hardware-Software Cooperation," Tera Computer Company, 1997, (16 pages).

Alverson et al., "The Tera Computer System," Tera Computer Company, 1990, (pp. 1-6).

Alverson et al., "Exploiting Heterogeneous Parallelism on a Multithreaded Multiprocessor, " Tera Computer Company, 1992, (pp. 188-197).

Smith et al., "The End of Architecture," $17^{th}$ Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages Eberle, et al., "Cryptographic Processor for Arbitrary Elliptic Curves over $GF(20^m)$," 11 pages.

Office Action from U.S. Appl. No. 10/881,169 mailed Feb. 20, 2007.

Office Action from U.S. Appl. No. 11/008,016 mailed Apr. 20, 2007.

Office Action from U.S. Appl. No. 11/008,016, mailed Sep. 4, 2007.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

Fig. 3

MPC2 to L2
Cache 120

MPC1 to L2
Cache 120

ARBITRATING CACHE MISSES IN A MULTITHREADED/MULTI-CORE PROCESSOR

BACKGROUND

1. Field of the Invention

This invention is related to processors and, more particularly, to cache miss handling in multithreaded processors.

2. Description of the Related Art

Presently, typical processors are single-threaded. That is, the instructions that are being executed concurrently in the processor all belong to the same thread. Instruction fetching in such processors generally involves fetching instructions from the single thread. In various implementations, branch prediction schemes may be used to control fetching or sequential fetching may be implemented. In either case, fetching may be redirected (if a branch misprediction occurs, or for a taken branch in the sequential fetch implementation, or for an exception, trap, etc. in either case).

Most present processors implement an instruction cache to store instructions for rapid fetching by the processor. While instruction cache access latency is shorter than memory access latency (or access latency to lower level caches, if a cache hierarchy is implemented), the instruction cache has a limited capacity and thus is subject to cache misses. A cache miss occurs in a cache if an access to a given address is performed and the corresponding instructions/data are not stored in the cache. In contrast, a cache hit occurs if the access is performed and the corresponding instructions/data are stored in the cache (and are provided by the cache in response to the access). Typically, a cache allocates and deallocates storage in contiguous blocks referred to as cache lines. That is, a cache line is the minimum unit of allocation/deallocation of storage space in the cache.

When an instruction cache miss occurs for a given cache line, the processor initiates a cache fill for that cache line. The cache fill generally includes retrieving the cache line from memory or a lower level cache and storing the cache line in the cache. While the cache fill is occurring, instruction fetching is generally stalled in the single threaded processor. Since instruction execution cannot progress beyond the cache miss, fetching instructions beyond the cache miss is not helpful.

More recently, multithreaded processors have been proposed. Particularly, in fine grain multithreading, the processor may have two or more threads concurrently in process. Instructions may be issued from any of the threads for execution. Thus, in some cases, instructions from different threads may be in adjacent pipeline stages in the processor. Since multiple threads are being fetched, instruction fetching mechanisms may be more complex. Additionally, utilizing fetch bandwidth efficiently becomes even more important when multiple threads are being fetched.

SUMMARY

In one embodiment, a processor comprises a cache and a cache miss unit coupled to the cache. The cache is coupled to be accessed by cache accesses corresponding to a plurality of threads active in the processor. The cache miss unit is configured to record a plurality of cache misses detected in the cache and to associate each cache miss of the plurality of cache misses with a corresponding thread of the plurality of threads for which that cache miss is detected. Additionally, the cache miss unit is configured to initiate a cache fill for a selected cache miss of the plurality of cache misses. The cache miss unit is configured to select the selected cache miss based on a prioritization of the corresponding threads associated with the plurality of cache misses.

In another embodiment, a processor comprises an instruction cache, a fetch control unit coupled to the instruction cache, and a cache miss unit coupled to the instruction cache. The fetch control unit is configured to schedule a plurality of threads to fetch from the instruction cache. The cache miss unit is configured to record a plurality of instruction cache misses and to associate each cache miss of the plurality of instruction cache misses with a corresponding thread of the plurality of threads for which that cache miss is detected. Furthermore, the cache miss unit is configured to arbitrate among the plurality of cache misses based on a prioritization of the corresponding threads to select a first cache miss of the plurality of cache misses for which to initiate a cache fill.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
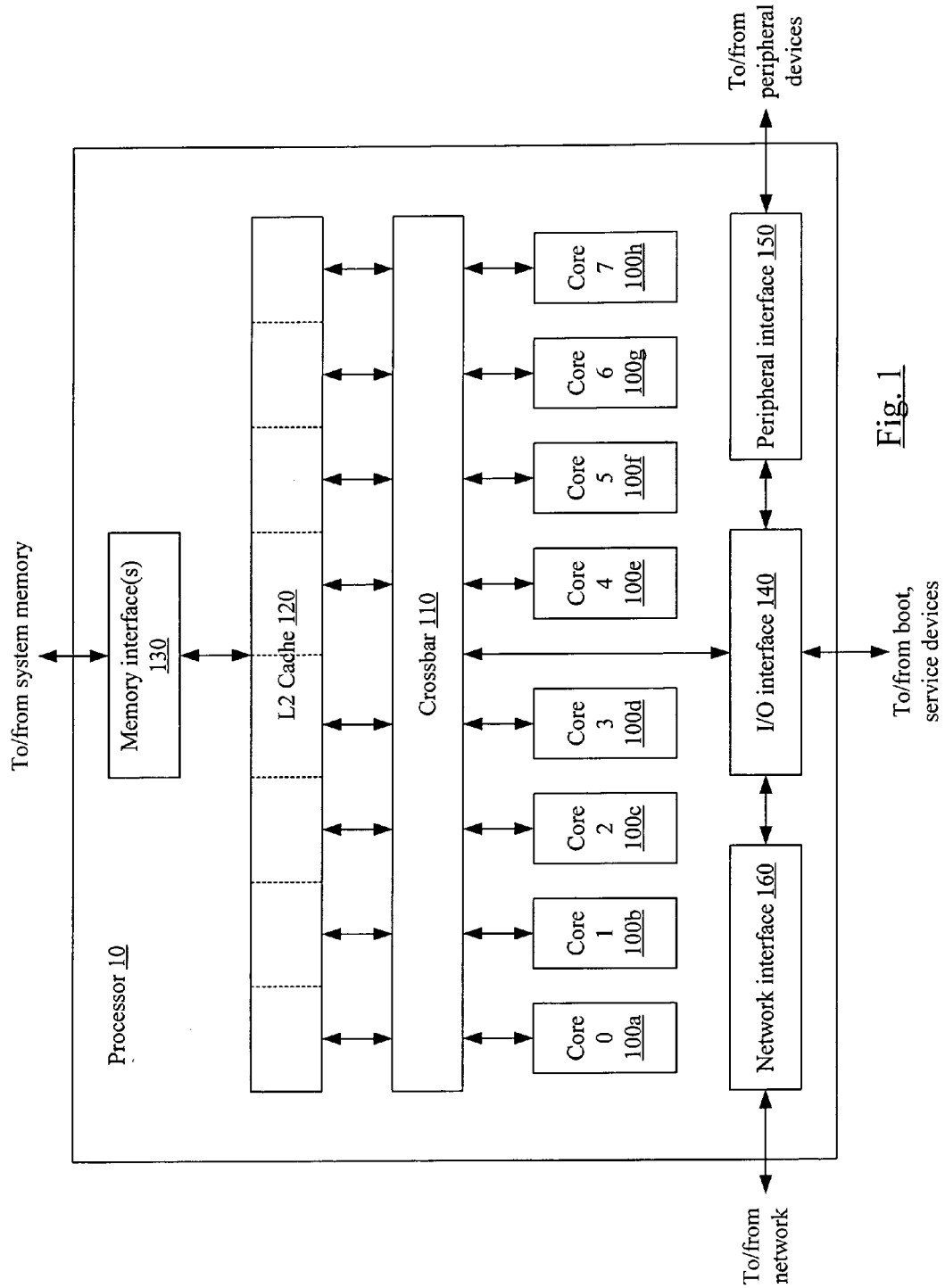
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
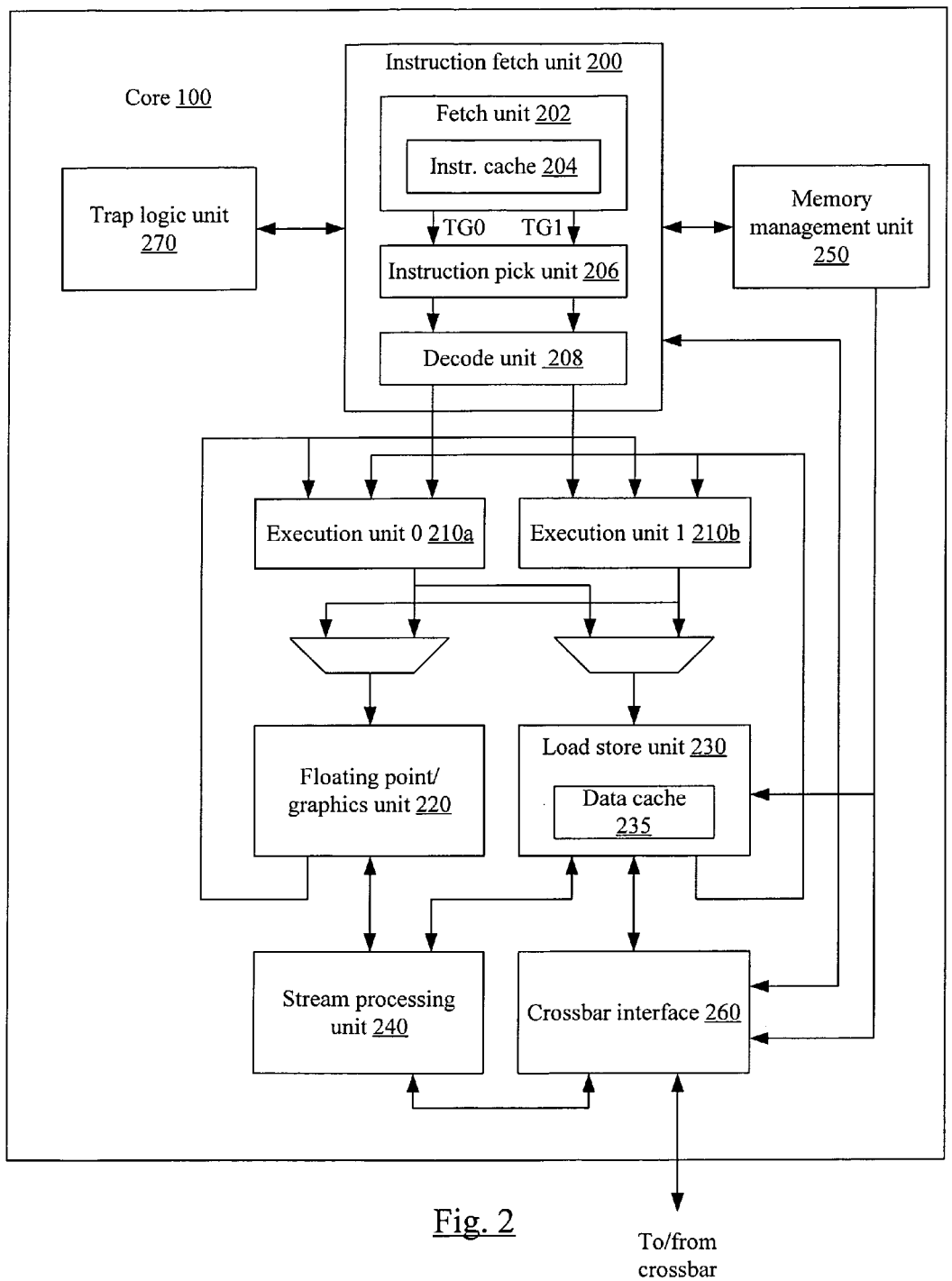
FIG. 2 is a block diagram of one embodiment of a core shown in FIG. 1.

FIGS. 1-3 present an overview of a multithreaded processor 10 that may implement the cache miss handling as described in more detail below. In other embodiments, the processor may be implement other multithreaded configurations, as desired.

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Cache Miss Handling

FIGS. 4-9 illustrate one embodiment of the fetch unit 202 and operation thereof for handling instruction cache misses and arbitrating the initiation of cache fills for the cache misses. Specifically, the fetch unit 202 may detect cache misses that result from fetches corresponding to the various threads, and may record the cache misses until the corresponding cache fills are completed to fill the missing cache lines into the instruction cache 204. Since multiple threads are fetching from the instruction cache 204, multiple cache misses may occur (e.g. up to one cache miss per thread, in some embodiments). Previous cache misses may be pending as new cache misses are detected.

In one embodiment, the fetch unit 202 may arbitrate among the pending cache misses to determine which cache miss will have its corresponding cache fill initiated first. The arbitration may be based on a prioritization of the threads to which the cache misses correspond. Specifically, the prioritization may be dynamic, in some embodiments, to provide each thread a relatively fair opportunity to have its cache fill initiated. That is, the prioritization may be designed to help ensure that threads are not starved for instructions when multiple cache misses have occurred or are occurring for different threads. The cache miss corresponding to the highest priority thread for which a pending cache miss has been recorded may be the cache miss selected for initiation of a cache fill (or the cache miss corresponding to the highest priority thread in a selected thread group, as explained in more detail below).

In one particular implementation, the arbitration scheme may be based on a rotating pointer (or round robin pointer) that identifies the current priority among the threads. The threads may be enumerated (e.g. 0 to 7 for eight threads, as mentioned above) and may be ordered according to the thread number. The order may be increasing numerical order or decreasing numerical order, in various embodiments. The highest priority thread may be the thread indicated by the pointer. The next highest priority thread may be adjacent to the highest priority thread in the numerical order (e.g. the next higher numbered thread or next lower numbered thread, in various embodiments), followed by the thread adjacent to the next highest priority thread, etc., wrapping when the end of the order is reached to the other end and continuing until the lowest priority thread is reached. The lowest priority thread is adjacent to the highest priority thread on the other side from the next highest priority thread (e.g. the next lower numbered thread or next higher numbered thread, in various embodiments). For the remainder of this discussion, increasing numerical order will be used as an example (e.g. if thread 1 is indicated by the pointer as highest priority, thread 2 is next highest priority, etc., wrapping to thread 0 at lowest priority). However, other embodiments may use decreasing numerical order or any other order. Still other embodiments may implement other prioritization mechanisms, such as ranking the threads according to least recently winning arbitration in an least recently used (LRU) style, etc.

In response to selecting a cache miss for which to initiate the cache fill, the pointer may be updated. In one embodiment, the pointer may be incremented (or decremented) to indicate the adjacent (next highest priority) thread. In other embodiments, the pointer may be updated to indicate the next thread in the order for which a cache miss is currently pending and the corresponding cache fill has not been initiated.

While a single rotating pointer may be used in some embodiments, in other embodiments multiple pointers may be used. For example, one pointer may be provided for each thread group. A thread group may be any subset of two or more of the threads supported in the processor core. The thread groups may be non-overlapping subsets, in one embodiment. While two thread groups are shown in the illustrated embodiment (corresponding to the EXUs 210A-210B), other embodiments may have more thread groups. Each pointer may prioritize the threads in the thread group, similar to the above discussion. Additionally, a value (referred to herein as the "group selector") may be maintained to identify which thread group is the "selected" thread group. If at least one cache miss is pending for a thread in the selected thread group and the corresponding cache fill has not been initiated, a cache miss is selected according to the pointer corresponding to the selected thread group. If no cache misses are pending for threads in the selected thread group, a cache miss corresponding to a thread in another thread group may be selected (according to the pointer for that other thread group). Once a cache miss for a thread in the selected thread group is selected, the group selector may be changed to identify another thread group as "selected". In the present embodiment, there are two thread groups and the group selector may be a bit identifying one of the thread groups when set and the other thread group when clear. Thus, updating the group selector may comprise inverting the bit. In other embodiments having more than two thread groups, the group selector may have other forms. For example, the group selector may be an LRU-style ranking of the thread groups, another rotating pointer among the thread groups, etc. An embodiment using a pointer per thread group and the group selector will be described in more detail below.

The above scheme may be viewed as a hierarchical selection mechanism, in some embodiments. That is, the pointers may be used, in parallel for each thread group, to identify the highest priority thread that has a cache miss awaiting initiation within that thread group. The group selector may be used to select the final arbitration winner from the thread groups, based on the ranking of the thread groups indicated by the group selector.

As mentioned above, a thread may comprise a set of instructions that execute independently of the instructions from another thread. In some embodiments, the core 100 may maintain separate state for each thread. For example, the register state for each thread may be separate from other threads. That is, the core 100 may access and update separate register state for each thread.

Initiating a cache fill may include transmitting a request to a source that may provide the cache line. For example, in the present embodiment, the L2 cache 120 may be a source for the cache line. In other embodiments, lower level caches such as the L2 cache may not be provided and the source may be the memory subsystem external to the processor 10 (which may include caches, in some embodiments, and a system memory).

Figure 4:
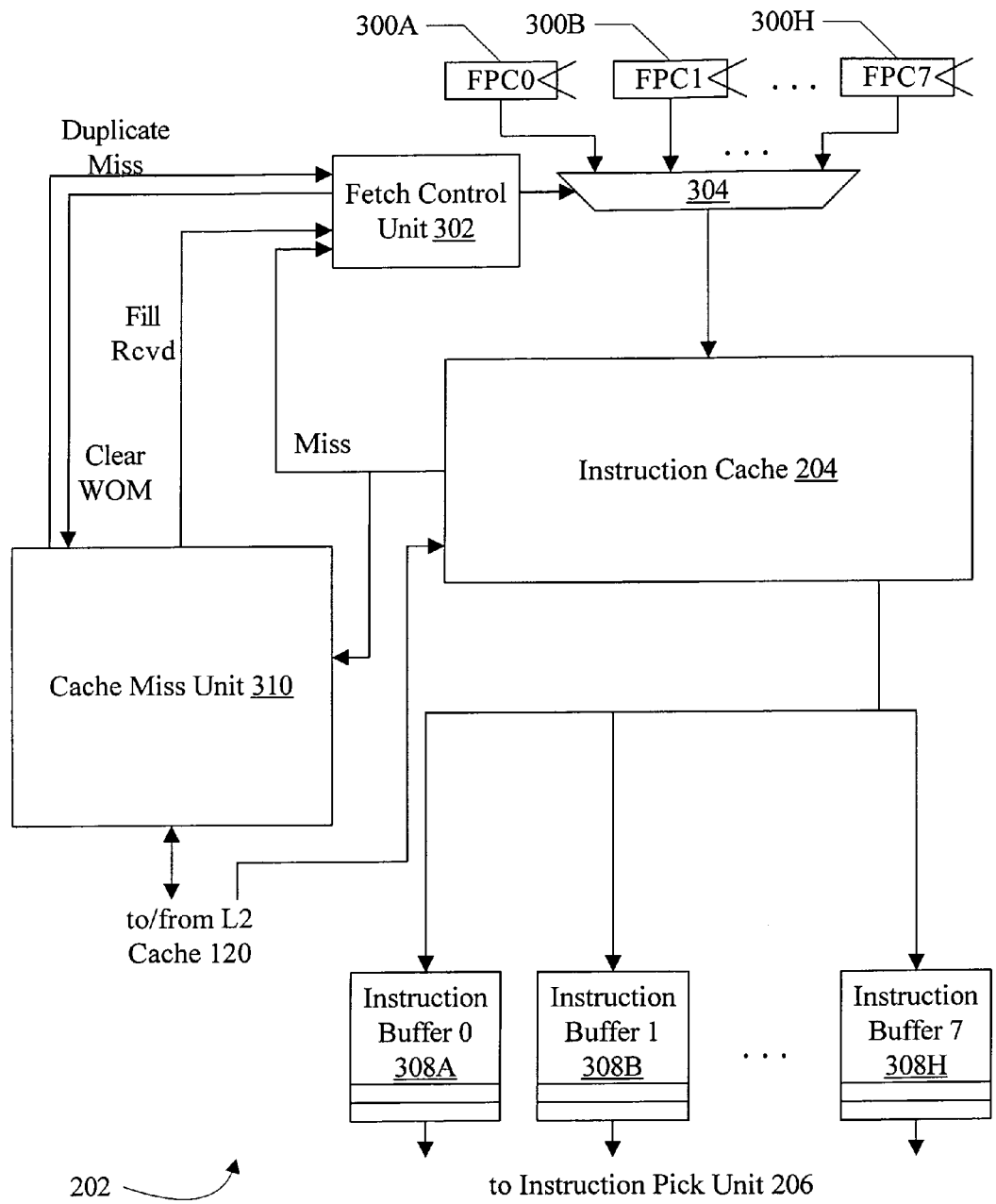
FIG. 4 is a block diagram illustrating one embodiment of a fetch unit shown in FIG. 2.

FIG. 4 illustrates certain components of one embodiment of the fetch unit 202 for implementing cache miss handling. Other components may be provided for other operation, as desired. In the illustrated embodiment, the fetch unit 202 includes a plurality of storage devices 300A-300H, each storing a fetch program counter (FPC) corresponding to a different one of the active threads being executed by the core 100. The fetch unit 202 further includes a fetch control unit 302, a multiplexor (mux) 304, the instruction cache 204, a set of instruction buffers 308A-308H, and a cache miss unit 310 in the illustrated embodiment.

In the illustrated embodiment, the storage devices 300A-300H are coupled to the mux 304, which is further coupled to the instruction cache 206 and to receive selection controls from the fetch control unit 302. The fetch control unit 302 is coupled to receive a duplicate miss indication and a fill received (Fill Rcvd) indication from the cache miss unit 310. Additionally, the fetch control unit 302 is coupled to receive a miss indication from the instruction cache 204. The fetch control unit 302 is coupled to provide a clear waiting on miss (WOM) indication to the cache miss unit 310. The instruction cache 204 is coupled to provide instructions, in the event of a cache hit, to the instruction buffers 308A-308H. Additionally, the instruction cache 204 is coupled to receive cache line data from the L2 cache 120 when a cache fill is returned. The instruction buffers 308A-308H are further coupled to the instruction pick unit 206. The cache miss unit 310 is coupled to communicate with the L2 cache 120.

In one embodiment, the instruction cache 204 may be N-way set associative (e.g. 8-way set associative in one implementation). In some embodiments, the number of ways may be greater than or equal to the maximum number of threads in the core 100. Other embodiments may implement direct mapped configurations or other configurations. The instruction cache 206 may further include an instruction TLB (ITLB), or an ITLB may be accessed in parallel with the instruction cache 206, in embodiments which implement virtual to physical address translation. The instruction cache 206 is further coupled to provide a miss indication to the fetch control unit 302 and the cache miss unit 310.

The operation of the embodiment of FIG. 4 may occur over several pipeline stages (although the number of pipeline stages and the assignment of operations to pipeline stages may vary from embodiment to embodiment). Pipeline storage devices have not been shown in FIG. 4, but may be inserted as desired at appropriate points. In one embodiment, the fetch control unit 302 may select (or schedule) a thread to fetch from the active threads in a "before fetch" (BF) stage, not shown in FIG. 3. While the illustrated embodiment shows the storage devices 300A-300H as sources of a fetch PC, other embodiments may include additional sources to the mux 304 (e.g. redirect PCs from various pipeline stages such as execute and writeback). The selected fetch PC is provided to the instruction cache 204, along with an indication of the selected thread such as a thread tag or thread identifier. The fetch control unit 302 may be further configured to update the various fetch PCs due to a fetch, a redirect of a thread, cache miss, fetch error, etc. (not shown in FIG. 4). As used herein, a PC may be any representation of the address at which an instruction or instructions are stored (e.g. a virtual address, a physical address, a portion of the address, etc.).

During the fetch stage, the instruction cache 204 accesses the instruction cache tags and cache lines responsive to the fetch PC. In one embodiment, the ITLB is also accessed and ITLB hit/miss is determined in the fetch stage as well, although other embodiments may make the hit/miss determination in the cache stage. In the cache stage, the instruction cache 204 determines instruction cache hit/miss for the fetch, and selects the hitting cache line for output to the instruction buffers 308A-308H if a hit is detected. For example, in some embodiments, the instruction cache 204 is physically tagged (that is, the instruction cache tags are physical addresses of the instruction cache lines) and the instruction cache 204 may compare the physical address from the ITLB with the tags to detect a hit/miss. In other embodiments, the instruction cache 204 may be virtually tagged (that is, the instruction cache tags are virtual addresses of the instruction cache lines) and the instruction cache 204 may compare the fetch PC with the tags to detect hit/miss. In a cache hit case, the instructions from the instruction cache may be stored in the instruction buffer 308A-308H corresponding to the thread that was fetched.

If a cache miss is detected, the instruction cache 206 may provide an indication of the cache miss to the fetch control unit 302 and the cache miss unit 310. For example, the instruction cache 204 may signal the cache miss and identify the thread for which the cache miss is detected. The fetch PC may be routed to the corresponding storage device 300A-300H for update (not shown in FIG. 4). Alternatively, the fetch control unit 302 may track which threads are in the fetch and cache stages and the instruction cache 204 may signal the cache miss to the fetch control unit 302 without identifying the thread.

The instruction cache 204 may also signal the cache miss to the cache miss unit 310. For the cache miss unit 310, the instruction cache 204 may identify the thread corresponding to the fetch that experienced the cache miss. Additionally, the instruction cache 204 may provide the miss PC to the cache miss unit 310. The miss PC may be the physical address corresponding to the fetch PC, as provided from the ITLB in the present embodiment.

In some cases, multiple threads may attempt to fetch the same instructions (e.g. if multiple threads are executing the same software code or if multiple threads share a section of code). The first thread to attempt a fetch of a cache line and miss is referred to as the "primary miss". The fetch unit 202 may inhibit fetching for the first thread, and continue fetching for other threads that have not experienced a cache miss. Subsequent cache misses by other threads to the cache line are referred to as "duplicate misses". When a primary miss is detected, the cache miss unit 310 may record the miss PC and associate the cache miss with the first thread. For example, the cache miss unit 310 may include storage devices that are preallocated to each thread. The cache miss may be associated with the first thread by storing the miss PC in a storage device allocated to the first thread. Alternatively, the thread ID for the first thread may be recorded along with the miss PC. To handle duplicate misses, the cache miss unit 310 may record which threads are waiting on the miss. For example, a WOM bit may be included for each possible thread. When a duplicate miss is detected, the cache miss unit 310 may set the WOM bit corresponding to the thread experiencing the duplicate miss. Additionally, the cache miss unit 310 may signal the duplicate miss to the fetch control unit 302 in the present embodiment. In conjunction with the miss from the instruction cache 204, the fetch control unit 302 may distinguish primary cache misses (no duplicate miss signal assertion) from duplicate cache misses (duplicate miss signal assertion).

The cache miss unit 310 is configured to communicate with the L2 cache 120 to initiate a cache fill for each pending cache miss. In other embodiments, the L2 cache 120 may not be provided and the cache miss unit 310 may communicate with memory interface(s) 130 to initiate cache fills. Generally, the cache miss unit 310 may provide the miss PC for the cache fill to the L2 cache 120.

As mentioned previously and described in more detail below, the cache miss unit 310 may arbitrate among the pending cache misses to select which cache miss will have a corresponding cache fill initiated, based on a prioritization of the threads corresponding to the cache misses. In the case of primary and duplicate misses described above, the thread associated with the primary miss may be the thread that corresponds to the cache miss for arbitration purposes. If a cache miss is detected and no pending cache misses are recorded in the cache miss unit 310, in some embodiments, the detected cache miss may have its cache fill initiated without passing through the arbitration mechanism.

The L2 cache 120 may indicate to the cache miss unit 310 that a cache line is being provided for storage in the instruction cache 204. In embodiments that implement bypassing, the cache miss unit 310 may use the WOM indication corresponding to the cache miss for which the cache line is being provided to identify which threads have the cache miss pending at the time the cache fill is provided, and may generate selection controls to bypass instructions from the cache line for storage to each of the instruction buffers 308A-308H that correspond to a thread that has the cache miss pending. The instruction cache 204 is also coupled to receive the cache line for storage. Additionally, the cache miss unit 310 may signal the fetch control unit 302 that a cache fill has been received, and may identify which threads the cache fill corresponds to (Fill Rcvd indication in FIG. 4). For example, the Fill Rcvd indication may include a signal for each thread, which may be asserted if a fill has been received for which that thread had a cache miss pending (as indicated by the WOM bits).

In some embodiments, a thread may be redirected after a cache miss (either primary or duplicate) has been detected. Generally, a thread may be referred to as "redirected" if execution of a previously fetched instruction causes instruction fetching to begin at a different address than the subsequent fetching used. For example, exceptions, traps, or interrupts experienced when executing an instruction may cause the thread to be redirected to an exception, trap, or interrupt handler. Control transfer instructions that are mispredicted (or, in the present embodiment, taken control transfer instructions) may cause fetching to be redirected to the correct address (target or sequential) of the control transfer instruction. If a redirect occurs after a cache miss has been detected for the thread, the instructions from the missing cache line may no longer be needed for that thread. The fetch control unit 302 may begin fetching the thread at the redirect address in response to a redirect. Additionally, in response to the redirect, the fetch control unit 302 may signal the cache miss unit 310 that the instructions from the missing cache line are no longer needed for the redirected thread using the clear WOM indication. The clear WOM indication may be any communication that identifies a thread or threads to be cleared from the WOM bits corresponding to cache misses recorded in the cache miss unit 310. For example, the clear WOM indication may include a signal for each thread that may be asserted to clear the pending cache miss for that thread. Alternatively, the clear WOM indication may be a numerical value identifying the thread for which the WOM bits in the cache miss unit 310 are to be cleared. The cache miss unit 310, in response to the clear WOM indication, may clear the corresponding WOM bits, if any, to indicate that a cache miss is no longer pending for the thread. In this fashion, the WOM bits may be updated such that they reflect which threads still have a cache miss pending when the cache line is returned for storage in the instruction cache 204. While the clear WOM indication is used in the present embodiment, in general a pending cache miss may be cancelled in any desired fashion when the corresponding thread is redirected.

The cache miss unit 310 and the fetch control unit 302 may respond to the clear WOM indication (or other cancellation of a cache miss) in different fashions, in one embodiment, depending on whether the cancelled miss is a primary miss or a duplicate miss. If the cancelled miss is a duplicate miss, the cache miss may be cancelled independent of other factors. The corresponding thread may begin fetching in response to the redirect, and may experience another cache miss (either duplicate or primary) as if the cancelled duplicate miss did not occur. If the cancelled miss is a primary miss, the cache miss may be cancelled and the corresponding thread may begin fetching freely in response to the redirect if the corresponding cache fill has not been initiated and if there are no pending duplicate misses for the cache line. If either the cache fill has been initiated or there are duplicate misses pending (or both), the primary miss may be cancelled (at least with respect to permitting the fetch to restart for the corresponding thread) and the corresponding thread may begin fetching according to the redirect. However, a new cache miss for the corresponding thread may not be permitted until the cache fill completes for the previous cache miss.

It is noted that, in the present embodiment, each of the instruction buffers 308A-308H corresponds to a different thread of the plurality of threads that the core 100 may have concurrently in process. Each instruction buffer 308A-308H may include at least one entry, and may have multiple entries. Any number of entries may be provided (e.g. 8 entries, in some embodiments). The instruction buffers 308A-308H may have any construction. However, in one implementation, each instruction buffer 308A-308H may comprise a single register storing entry 0 of the buffer (the oldest instruction in the buffer) and a memory array storing the remaining entries (with pointers indicating the oldest and youngest instructions in the memory array). As instructions are successfully issued for execution, the next instruction in program order may be read from the memory array and shifted into the register.

In the present embodiment, the instruction buffers feed the instruction pick unit 206, which schedules instructions for execution (e.g. according to thread group, as discussed above). Other embodiments may have other constructions. For example, each instruction buffer may feed dedicated resources for the thread (e.g. execution resources may be dedicated to each thread).

While mux 304 is illustrated in FIG. 4, any selection devices may be used as desired, including parallel or cascaded sets of muxes. Additionally, storage devices 300A-300H (and other storage devices described herein) may comprise any sort of storage device (e.g. latches, flops, registers, etc.).

While the illustrated embodiment describes handling of cache misses in the instruction cache 204, a similar mechanism may be used to handle cache misses in the data cache 235 (e.g. recording cache misses, arbitrating among pending cache misses to initiate cache fills to the L2 cache for the corresponding cache line using dynamic prioritizations of the threads, etc.). If a thread experiences a data cache miss, the thread may be flushed from the pipeline of the core 100, in some embodiments (e.g. to prevent instructions dependent on the result of the cache access that caused the cache miss from executing) and fetching may be restarted at the instruction that experienced the data cache miss when the cache fill is completed.

Figure 5:
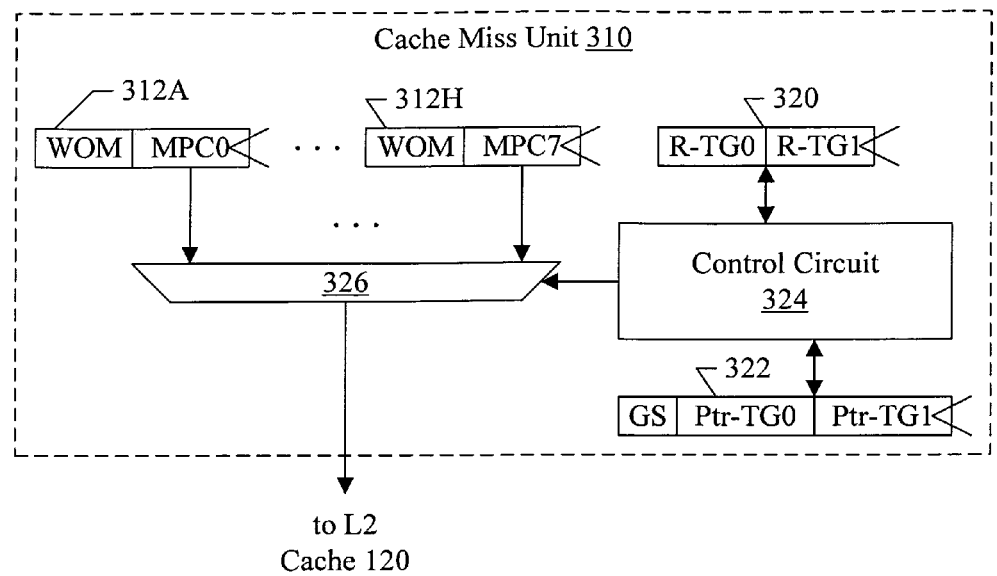
FIG. 5 is a block diagram illustrating one embodiment of a cache miss unit shown in FIG. 4.

Turning now to FIG. 5, a block diagram is shown illustrating one embodiment of components that may be included in one embodiment of the cache miss unit 310 for arbitrating among pending cache misses. In the illustrated embodiment, the cache miss unit 310 includes storage devices 312A-312H for recording cache misses, a storage device 320 configured to store request indications (e.g. request bits), a storage device 322 storing arbitration state (e.g. including a group selector (GS) and pointers for each thread group (Ptr-TG0 and Ptr-TG1)), a control circuit 324, and a mux 326. The mux 326 is coupled to receive the miss PCs from the storage devices 312A-312H as inputs and is coupled to provide an output to the L2 cache 120. The control circuit 324 is coupled to provide selection control to the mux 326 and is coupled to the storage devices 320 and 322.

In one embodiment, the cache miss unit 310 may support up to one pending primary cache miss per thread. The storage devices 312A-312H may be permanently allocated to particular threads (to store the miss PC for the primary miss from that particular thread), or may be used as needed to store miss PCs corresponding to any thread. Other embodiments may support more or fewer pending cache misses and/or more or fewer pending cache misses per thread. A cache miss is pending if the cache miss has been detected with respect to a fetch of at least one thread, and the cache line has not yet been returned and written into the instruction cache 204 to complete the cache fill. For each pending cache miss, the cache miss unit 310 may record which threads have the cache miss pending. The waiting on miss (WOM) bits in each storage device 312A-312H may be used to record the pending cache misses.

The storage device 320 may store a request bit for each thread, indicating whether or not a pending cache miss for that thread is awaiting initiation of a cache fill. That is, the request bits may represent which threads are to participate in the arbitration for initiation of cache fills. For example, the request bit may indicate a pending cache miss awaiting cache fill initiation when set, and no pending cache miss awaiting cache fill initiated when clear. Other embodiments may reverse the meaning of the bit states or use other indications. The request bit corresponding to a given thread may be set when a primary cache miss is detected for the given thread. The request bit may be cleared if the primary cache miss is cancelled prior to initiating the cache fill (e.g. due to a redirect). Additionally, the control circuit 324 may clear the request bit when the cache fill is initiated (e.g. responsive to the thread winning the arbitration and the cache fill request being transmitted to the L2 cache 120 successfully).

Responsive to the request bits in the storage device 320 and the arbitration state in the storage device 322, the control circuit 324 may select an arbitration winner and may generate selection controls to the mux 326 to select the cache miss corresponding to the thread that wins the arbitration. In the illustrated embodiment, the request bits are logically divided into request bits for thread group 0 (R-TG0) and request bits for thread group 1 (R-TG1). This logical division corresponds to the pointers for the thread groups (Ptr-TG0 and Ptr-TG1). That is, each pointer may indicate one of the threads in the corresponding thread group, and thus the corresponding request bit in the corresponding thread group. The identified thread/request bit is considered highest priority in the current priority for that group, and other threads/request bits are arranged in priority based on their relative position with respect to the identified thread/request bit. By prioritizing the request bits, the control circuit 324 is effectively prioritizing the threads (and the corresponding cache misses), since each request bit corresponds to one of the threads and each cache miss is associated with a thread. A set request bit, indicating that a cache miss associated with the corresponding thread is awaiting initiation of a cache fill, is referred to as a "valid request" below for convenience in the description.

Figure 6:
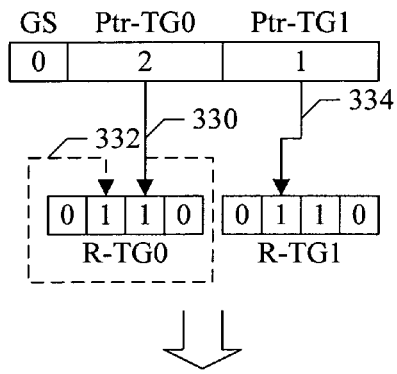
FIG. 6 is an example of cache miss arbitration.

More specifically, the control circuit 324 may prioritize the requests in the selected thread group (indicated by the group selector) according to the pointer for that thread group and may select the highest priority valid request in that thread group (if any). If a valid request is selected from the selected thread group, the pointer may be updated to point to the next valid request in the thread group. In such embodiments, the request bit indicated by the pointer may frequently be the highest priority valid request. FIG. 6 is an example. The group selector is 0, indicating thread group 0, and the request bits for thread group 0 (R-TG0) include two valid requests (for threads 1 and 2, respectively). The pointer for thread group 0 (Ptr-TG0) is pointing the thread 2, as indicated by the solid arrow 330 in FIG. 6. Accordingly, thread 2 is currently highest priority. Since thread 2 is highest priority and has a valid request, thread 2 is selected and thus the miss PC corresponding to thread 2 (MPC2 in FIG. 6) is transmitted to the L2 cache 120 to initiate the cache fill for thread 2. Additionally, the Ptr-TG0 is updated to point to the next highest priority valid request (which is thread 1 in this example, after wrapping around from the thread 3 to thread 0, neither of which has a valid request in this example—illustrated in FIG. 6 by dotted arrow 332). The request bit for thread 2 is cleared and the group selector (GS) is also updated since a thread from the selected thread group is the winner of the arbitration, although these updates are not shown in FIG. 6. The pointer Ptr-TG1 is not updated, since a cache miss from thread group 1 was not selected as the winner of the arbitration.

If no cache misses were pending in thread group 0 for the example of FIG. 6, a similar selection may occur from thread group 1 to declare a winner of the arbitration. In the example of FIG. 6, the winner would be thread 5 (which has a valid request, and is indicated as currently highest priority in thread group 1 via the Ptr-TG1—solid arrow 334). In such an example, MPC5 would be transmitted to the L2 cache 120 and the Ptr-TG1 would be updated to indicate the next highest priority valid request (thread 6 in the example of FIG. 6). The request bit for thread 5 would be cleared. However, the GS would not be updated since a thread from the selected thread group (group 0) was not selected as the winner of the arbitration.

It is noted that, while the threads in thread group 1 may be enumerated 4 to 7 in the present embodiment, the pointer Ptr-TG1 may be relative to the first thread in the thread group (e.g. thread 4 may be indicated by a Ptr-TG1 value of 0, thread 5 may be indicated by a Ptr-TG1 value of 1, etc.) as illustrated in FIG. 6. In other embodiments, the pointer may not be relative and may use the absolute thread numbers (or thread IDs).

Figure 7:
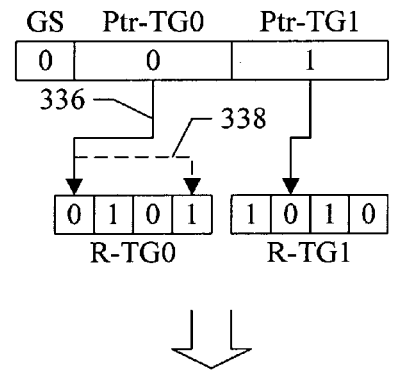
FIG. 7 is another example of cache miss arbitration.

As mentioned above, request bits may be cleared if a cache miss is cancelled prior to a cache fill being initiated for the cache miss (e.g. due to a redirect of the thread for which the cache miss was detected). In such embodiments, the pointer for a thread group may not be pointing to a valid request when the arbitration occurs. The control circuit 324 may scan the request bits in order of the current priority to select the highest priority valid request. FIG. 7 is an example. In FIG. 7, the selected group is again thread group 0, and the Ptr-TG0 is pointing to thread 0 (solid arrow 336). However, the request bit for thread 0 is clear. Accordingly, scanning through the current priority from thread 0, the highest priority valid request is for thread 1. Thus, the miss PC for thread 1 is selected as the arbitration winner and is transmitted to the L2 cache 120. Additionally, the Ptr-TG0 is updated to the next highest priority valid request after the request for thread 1 (thread 3 in this example, dotted arrow 338). Additionally, the request bit for thread 1 is cleared and the GS is updated to indicate thread group 1, although these updates are not shown in FIG. 7.

If no cache misses were pending in thread group 0 for the example of FIG. 7, a similar selection may occur from thread group 1 to declare a winner of the arbitration. In the example of FIG. 7, the winner would be thread 6 (since thread 5 is indicated by the Ptr-TG1 and does not have a valid request, and thread 6 does have a valid request). In such an example, MPC6 would be transmitted to the L2 cache 120 and the Ptr-TG1 would be updated to indicate the next highest priority valid request (thread 4 in the example of FIG. 7, wrapping around after scanning up to thread 7). The request bit for thread 6 would be cleared. However, the GS would not be updated since a thread from the selected thread group (group 0) was not selected as the winner of the arbitration.

Figure 8:
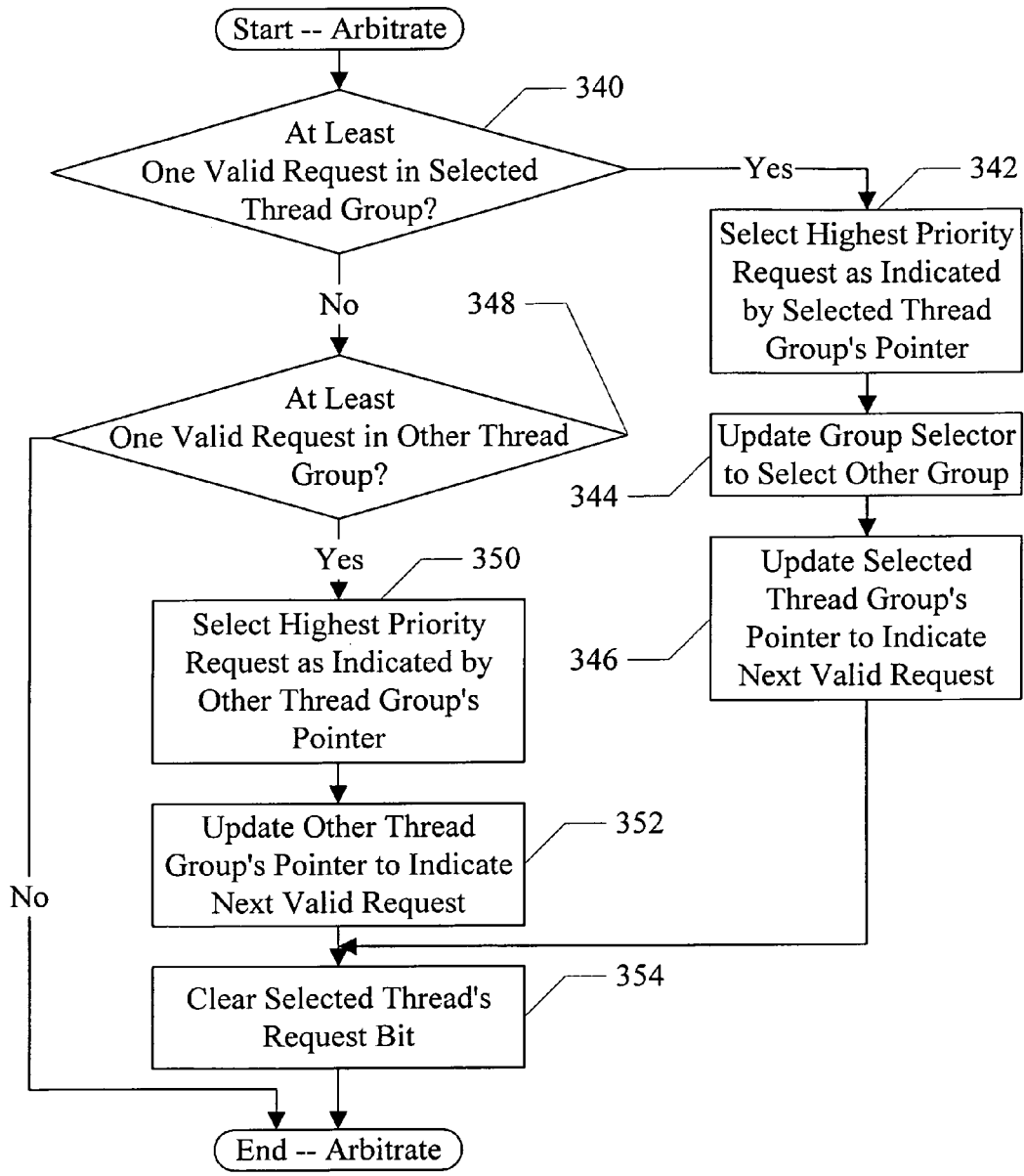
FIG. 8 is a flowchart illustrating one embodiment of arbitration in one embodiment of the cache miss unit shown in FIGS. 4 and 5.

Turning now to FIG. 8, a flowchart is shown illustrating operation of one embodiment the cache miss unit 310 for arbitrating among the cache misses to select a cache miss for which a cache fill is to be initiated. The blocks shown in FIG. 8 illustrate the general operation of the circuitry, and may not be indicative of the specific circuits used in a specific implementation. For example, circuitry may select the highest priority request in each thread group (as indicated by the corresponding pointer) in parallel, and select the winning thread group based on the group selector. The highest priority request in the winning thread group may be the arbitration winner.

If there is at least one valid request corresponding to a thread in the selected thread group (decision block 340, "yes" leg), the cache miss unit 310 may select the highest priority valid request in the selected thread group (where the highest priority valid request is determined based on the pointer for the selected thread group—block 342). The highest priority valid request may correspond to the thread indicated by the pointer, or the cache miss unit 310 may scan the requests in the order of thread priority indicated by the pointer to locate the highest priority valid request. Additionally, the cache miss unit 310 may update the group selector to select the other thread group (block 344), and may update the selected thread group's pointer to indicate the next valid request in the thread group (block 346). The cache miss unit 310 may clear the selected thread's request bit (block 354).

If there are no valid requests in the selected thread group, and if there is at least one valid request in the other thread group (decision block 348, "yes" leg), the cache miss unit 310 may select the highest priority valid request in the other thread group (where the highest priority valid request is determined based on the pointer for the other thread group—block 350). The highest priority valid request may correspond to the thread indicated by the pointer, or the cache miss unit 310 may scan the requests in the order of thread priority indicated by the pointer to locate the highest priority valid request. Additionally, the cache miss unit 310 may update the selected thread group's pointer to indicate the next valid request in the thread group (block 352). The cache miss unit 310 may clear the selected thread's request bit (block 354).

If there are no valid requests in any thread groups (decision block 340, "no" leg and decision block 348, "no" leg), there may be no winner of the arbitration, and thus no cache fill may be initiated.

Figure 9:
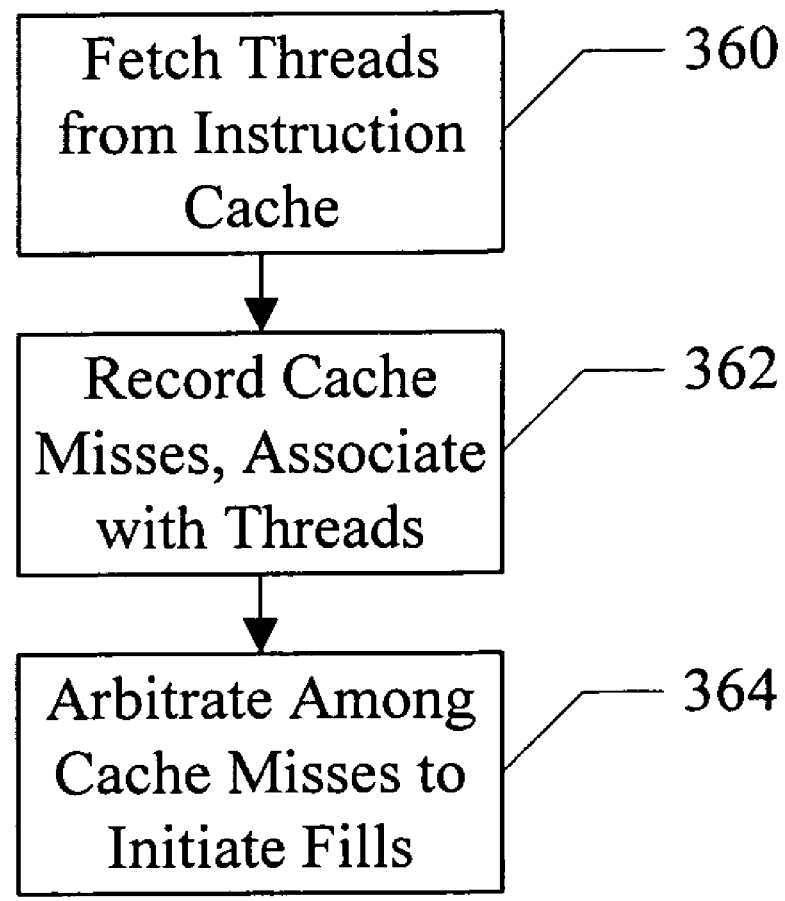
FIG. 9 is a high level flowchart illustrating a method of fetching for a plurality of threads from an instruction cache and handling cache misses.

FIG. 9 is a flowchart illustrating one embodiment of a method for fetching for a plurality of threads from an instruction cache that is shared by the plurality of threads and for handling misses in the instruction cache. The method may include fetching for a plurality of threads in the instruction cache (block 360). For example, the threads may be scheduled for fetching using a shared port or ports on the instruction cache. If any cache misses are detected as the various threads fetch from the instruction cache, the cache misses are recorded (block 362). Each recorded cache miss may be associated with the corresponding thread whose fetches caused the cache miss. If more than one cache miss is pending, arbitration among the cache misses may be performed to initiate cache fills (block 364). The arbitration may be based on a prioritization of the corresponding threads (e.g. similar to the flowchart of FIG. 8 or other prioritizations described herein).

Exemplary System Embodiment

Figure 10:
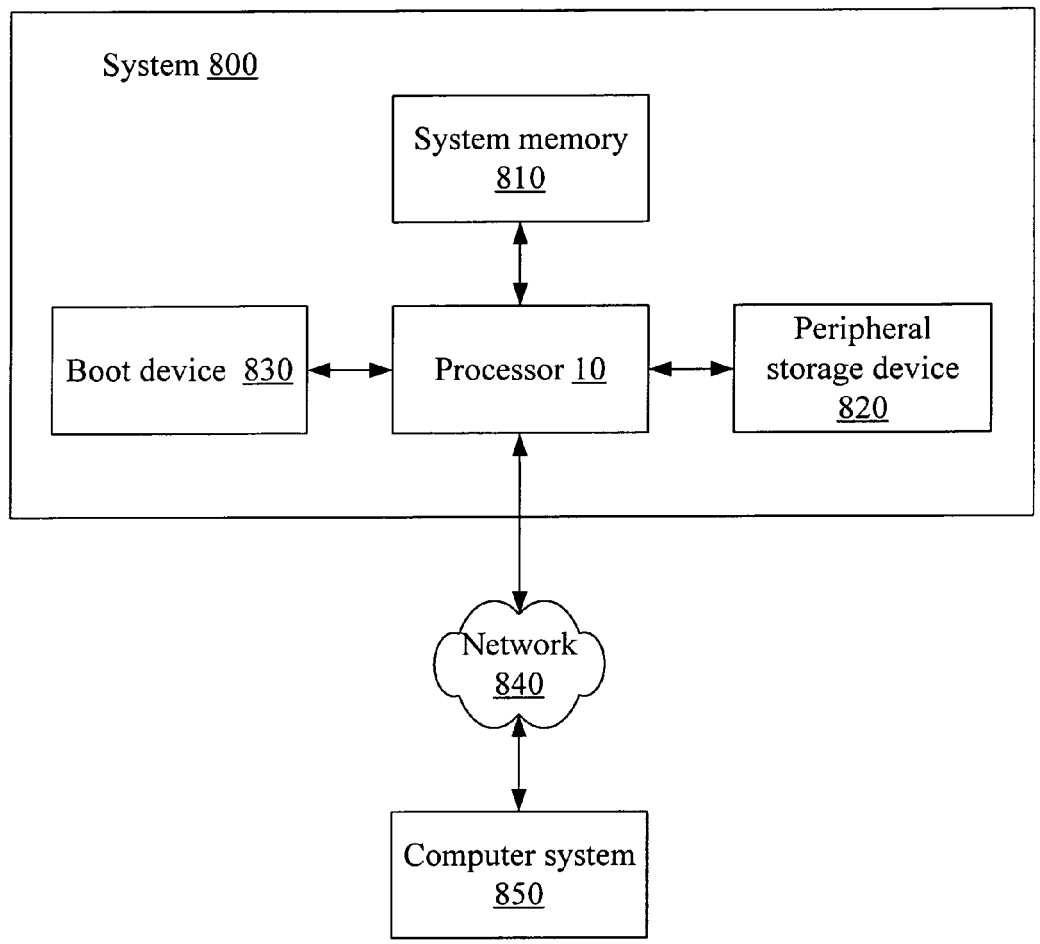
FIG. 10 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 10. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
    an instruction cache;
    a fetch control unit coupled to the instruction cache, wherein the fetch control unit is configured to schedule a plurality of threads to fetch from the instruction cache; and
    a cache miss unit coupled to the instruction cache, wherein the cache miss unit is configured to record a plurality of instruction cache misses and to associate each cache miss of the plurality of instruction cache misses with a corresponding thread of the plurality of threads for which that cache miss is detected, and wherein the cache miss unit is configured to arbitrate among the plurality of cache misses based on a prioritization of the corresponding threads to select a first cache miss of the plurality of cache misses for which to initiate a cache fill.

2. The processor as recited in claim 1 wherein the cache miss unit comprises a plurality of storage devices, and wherein each storage device of the plurality of storage devices is allocated to a respective thread of the plurality of threads, and wherein the cache miss unit is configured to associate each cache miss with the corresponding thread by recording the cache miss in the storage device allocated to the corresponding thread.

3. The processor as recited in claim 1 wherein the cache miss unit is configured to associate each cache miss with the corresponding thread by recording a thread identifier indicative of the corresponding thread with the cache miss.

4. The processor as recited in claim 1 wherein the cache miss unit is configured to maintain at least a first pointer that identifies a current priority among at least a first subset of the plurality of threads, and wherein the cache miss unit is configured to prioritize at least a first subset of the plurality of cache misses that correspond to the first subset of the plurality of threads based on the first pointer and to select a highest priority cache miss.

5. The processor as recited in claim 4 wherein the cache miss unit is configured, responsive to selecting the highest priority cache miss, to change a value of the first pointer to indicate a next highest priority cache miss of the first subset of the plurality of cache misses.

6. The processor as recited in claim 4 wherein the plurality of threads are divided into a plurality of thread groups, and wherein each thread group of the plurality of thread groups comprises a plurality of the plurality of threads, and wherein the cache miss unit is configured to maintain a plurality of pointers including the first pointer, and wherein each of the plurality of pointers corresponds to a respective thread group of the plurality of thread groups and indicates a priority of cache misses within the respective thread group.

7. The processor as recited in claim 6 wherein the cache miss unit is configured to maintain a value that identifies a selected thread group among the plurality of thread groups.

8. The processor as recited in claim 7 wherein, if at least one cache miss having a corresponding thread in the selected thread group is recorded in the cache miss unit, the cache miss unit is configured to select the first cache miss having the corresponding thread within the selected thread group.

9. The processor as recited in claim 8 wherein, if the first cache miss has a corresponding thread in the selected thread group, the cache miss unit is configured to change the value to indicate a different thread group.

10. The processor as recited in claim 1 wherein, responsive to more than one of the plurality of threads experiencing an instruction cache miss for a same cache block, a first thread of the plurality of threads is identified as a primary cache miss for the cache block and wherein the first thread is associated with the instruction cache miss for arbitration.

11. A method comprising:
    fetching for a plurality of threads in an instruction cache;
    recording a plurality of instruction cache misses detecting during the fetching, wherein the recording includes associating each cache miss of the plurality of instruction cache misses with a corresponding thread of the plurality of threads for which that cache miss is detected; and
    arbitrating among the plurality of cache misses based on a prioritization of the corresponding threads to select a first cache miss of the plurality of cache misses for which to initiate a cache fill.

12. The method as recited in claim 11 wherein associating each cache miss with the corresponding thread comprises recording the cache miss in a storage device that is allocated to the corresponding thread.

13. The method as recited in claim 11 wherein associating each cache miss with the corresponding thread comprises recording a thread identifier indicative of the corresponding thread with the cache miss.

14. The method as recited in claim 11 further comprising:
    maintaining at least a first pointer that identifies a current priority among at least a first subset of the plurality of threads;

prioritizing at least a first subset of the plurality of cache misses that correspond to the first subset of the plurality of threads based on the first pointer; and selecting a highest priority cache miss.

15. The method as recited in claim 14 further comprising, responsive to selecting the highest priority cache miss, changing a value of the first pointer to indicate a next highest priority cache miss of the first subset of the plurality of cache misses.

16. The method as recited in claim 14 wherein the plurality of threads are divided into a plurality of thread groups, and wherein each thread group of the plurality of thread groups comprises a plurality of the plurality of threads, the method further comprising maintaining a plurality of pointers including the first pointer, wherein each of the plurality of pointers corresponds to a respective thread group of the plurality of thread groups and indicates a current priority of cache misses within the respective thread group.

17. The method as recited in claim 16 further comprising maintaining a value that identifies a selected thread group among the plurality of thread groups.

18. The method as recited in claim 17 wherein, if at least one cache miss having a corresponding thread in the selected thread group is recorded, selecting the first cache miss having the corresponding thread within the selected thread group.

19. The method as recited in claim 18 wherein, if the first cache miss has a corresponding thread in the selected thread group, the cache miss unit is configured to change the value to indicate a different thread group.

20. The method as recited in claim 11 wherein, responsive to more than one of the plurality of threads experiencing an instruction cache miss for a same cache block, a first thread of the plurality of threads is identified as a primary cache miss for the cache block and wherein the first thread is associated with the instruction cache miss for arbitration.

21. A processor comprising:
a cache coupled to be accessed by cache accesses corresponding to a plurality of threads active in the processor; and
a cache miss unit coupled to the cache, wherein the cache miss unit is configured to record a plurality of cache misses detected in the cache and to associate each cache miss of the plurality of cache misses with a corresponding thread of the plurality of threads for which that cache miss is detected, and wherein the cache miss unit is configured to initiate a cache fill for a selected cache miss of the plurality of cache misses, and wherein the cache miss unit is configured to select the selected cache miss based on a prioritization of the corresponding threads associated with the plurality of cache misses.

22. The processor as recited in claim 21 wherein the cache miss unit is configured to maintain at least a first pointer that identifies a current priority among at least a first subset of the plurality of threads, and wherein the cache miss unit is configured to prioritize at least a first subset of the plurality of cache misses that correspond to the first subset of the plurality of threads based on the first pointer and to select a highest priority cache miss.

23. The processor as recited in claim 22 wherein the cache miss unit is configured, responsive to selecting the highest priority cache miss, to change a value of the first pointer to indicate a next highest priority cache miss of the first subset of the plurality of cache misses.

24. The processor as recited in claim 22 wherein the plurality of threads are divided into a plurality of thread groups, and wherein each thread group of the plurality of thread groups comprises a plurality of the plurality of threads, and wherein the cache miss unit is configured to maintain a plurality of pointers including the first pointer, and wherein each of the plurality of pointers corresponds to a respective thread group of the plurality of thread groups and indicates a priority of cache misses within the respective thread group.

25. The processor as recited in claim 24 wherein the cache miss unit is configured to maintain a value that identifies a selected thread group among the plurality of thread groups.

26. The processor as recited in claim 25 wherein, if at least one cache miss having a corresponding thread in the selected thread group is recorded in the cache miss unit, the cache miss unit is configured to select the first cache miss having the corresponding thread within the selected thread group.

27. The processor as recited in claim 26 wherein, if the first cache miss has a corresponding thread in the selected thread group, the cache miss unit is configured to change the value to indicate a different thread group.

28. The processor as recited in claim 21 wherein, responsive to more than one of the plurality of threads experiencing a cache miss for a same cache block, a first thread of the plurality of threads is identified as a primary cache miss for the cache block and wherein the first thread is associated with the cache miss for arbitration.

* * * * *